US012610163B2

(12) United States Patent
Koifman et al.

(10) Patent No.: US 12,610,163 B2
(45) Date of Patent: Apr. 21, 2026

(54) LOW-POWER/SMALL-AREA CURRENT-MODE PIXEL READOUT CIRCUIT

(71) Applicant: APPLE INC., Cupertino, CA (US)

(72) Inventors: Vladimir Koifman, Rishon Lezion (IL); Anatoli Mordakhay, Hadera (IL)

(73) Assignee: Apple Inc., Cupertino, CA (US)

( * ) Notice: Subject to any disclaimer, the term of this patent is extended or adjusted under 35 U.S.C. 154(b) by 108 days.

(21) Appl. No.: 18/772,182

(22) Filed: Jul. 14, 2024

(65) Prior Publication Data

US 2025/0203244 A1 Jun. 19, 2025

Related U.S. Application Data

(60) Provisional application No. 63/609,914, filed on Dec. 14, 2023.

(51) Int. Cl.
*H04N 25/78* (2023.01)
*H04N 25/616* (2023.01)
*H04N 25/77* (2023.01)

(52) U.S. Cl.
CPC .......... *H04N 25/78* (2023.01); *H04N 25/616* (2023.01); *H04N 25/77* (2023.01)

(58) Field of Classification Search
CPC ...... H04N 25/78; H04N 25/616; H04N 25/77; H04N 5/355; H04N 5/378; H04N 5/357;
(Continued)

(56) References Cited

U.S. PATENT DOCUMENTS

| | | | |
|---|---|---|---|
| 5,144,442 A | 9/1992 | Ginossar et al. | |
| 6,486,504 B1 * | 11/2002 | Guidash ................. | H04N 25/59 |
| | | | 348/E3.018 |

(Continued)

FOREIGN PATENT DOCUMENTS

| | | |
|---|---|---|
| DE | 102021209943 A1 | 3/2022 |
| EP | 2123019 B1 | 9/2019 |

(Continued)

OTHER PUBLICATIONS

Shukri, "Apple's Newest iPhone Three Camera System is "Campacked"," Image Sensors Technology, TechInsights Inc., pp. 1-10, year 2023.

(Continued)

*Primary Examiner* — Abdelaaziz Tissire
(74) *Attorney, Agent, or Firm* — Meitar Patents LTD.; Daniel Kligler

(57) ABSTRACT

An imaging device includes a pixel-circuit and a readout circuit. The pixel-circuit is configured to (i) transfer a reset charge of a photodetector to a storage node upon being reset, (ii) generate a reset output voltage according to the reset charge, (iii) accumulate electrical charge in the photodetector in response to incident light, (iv) transfer the accumulated electrical charge to the storage node, and (v) generate a pixel output voltage according to the accumulated charge stored in the storage node. The readout circuit is configured to (i) during a setup phase, charge a capacitor according to the reset output voltage, and (ii) during a measure phase, discharge the capacitor, and measure a discharge time until the charge on the capacitor is according to the pixel output voltage.

10 Claims, 12 Drawing Sheets

(58) Field of Classification Search

CPC ........... H04N 5/37452; H04N 5/37455; H04N 5/361; H04N 5/3559; H04N 5/369; H04N 5/3745; H04N 5/35563; H04N 5/347; H04N 9/045; H01L 27/14645; H01L 27/14612; H01L 27/14643; H01L 29/739; H01L 29/7391; H01L 27/14609; H01L 27/146; H01L 27/14621

See application file for complete search history.

(56) References Cited

U.S. PATENT DOCUMENTS

| | | | |
|---|---|---|---|
| 6,570,617 B2 | | 5/2003 | Fossum et al. |
| 8,068,155 B2 | * | 11/2011 | Muroshima ............ H04N 25/78 |
| | | | 348/308 |
| 8,169,517 B2 | | 5/2012 | Poonnen et al. |
| 8,606,009 B2 | | 12/2013 | Sun |
| 9,344,635 B2 | | 5/2016 | Vogelsang et al. |
| 9,571,774 B2 | | 2/2017 | Koifman et al. |
| 9,930,278 B2 | * | 3/2018 | Koifman ................ H04N 25/78 |
| 10,205,903 B2 | * | 2/2019 | Koifman ................ H04N 25/78 |
| 10,250,832 B1 | | 4/2019 | Xu et al. |
| 10,798,322 B2 | | 10/2020 | Smith et al. |
| 10,859,434 B2 | | 12/2020 | Panicacci |
| 11,336,860 B2 | | 5/2022 | Yonemoto |
| 12,279,055 B2 | | 4/2025 | Koifman |
| 2009/0059044 A1 | * | 3/2009 | Tay ...................... H04N 25/616 |
| | | | 348/294 |
| 2010/0039543 A1 | * | 2/2010 | Muroshima .......... H04N 25/671 |
| | | | 348/300 |
| 2010/0271517 A1 | * | 10/2010 | De Wit ................ H04N 25/771 |
| | | | 348/294 |
| 2011/0304755 A1 | * | 12/2011 | Kondo ................... H04N 25/78 |
| | | | 348/294 |
| 2014/0159702 A1 | | 6/2014 | Doege |
| 2016/0240572 A1 | | 8/2016 | Koifman et al. |
| 2016/0241795 A1 | * | 8/2016 | Nishihara .............. H04N 25/65 |
| 2016/0269661 A1 | | 9/2016 | Hseih et al. |
| 2017/0118430 A1 | * | 4/2017 | Koifman ................ H04N 25/78 |
| 2018/0184026 A1 | * | 6/2018 | Kato .................... H04N 25/677 |
| 2018/0227516 A1 | | 8/2018 | Mo et al. |
| 2018/0227523 A1 | | 8/2018 | Mo et al. |
| 2020/0260037 A1 | * | 8/2020 | Cho .................... H04N 25/618 |
| 2020/0382726 A1 | | 12/2020 | Inaoka et al. |
| 2023/0011827 A1 | | 1/2023 | Cho et al. |
| 2024/0089623 A1 | | 3/2024 | Koifman |
| 2024/0098386 A1 | | 3/2024 | Koifman |
| 2025/0024170 A1 | | 1/2025 | Panicacci et al. |
| 2025/0024175 A1 | | 1/2025 | Koifman |

FOREIGN PATENT DOCUMENTS

| | | |
|---|---|---|
| KR | 20200098764 A | 8/2020 |
| WO | 2023018841 A9 | 2/2023 |

OTHER PUBLICATIONS

Spivak et al., "Wide-Dynamic-Range CMOS Imaging Devices—Comparative Performance Analysis", IEEE Transactions on Electron Devices, vol. 56, No. 11, pp. 2446-2461, Nov. 2009.

Wikipedia, "Internet of Things (IoT)," pp. 1-53, latest edit Apr. 18, 2023.

Robidoux et al., "End-to-end High Dynamic Range Camera Pipeline Optimization," Conference Paper, Conference on Computer Vision and Pattern Recognition (CVPR) 2021, pp. 1-11, year 2021.

Ernst et al., "HDR+ with Bracketing on PixelPhones," Blog, Google Research, pp. 1-8, Apr. 23, 2021, as downloaded from as downloaded from https://blog.research.google/2021/04/hdr-with-bracketing-on-pixel-phones.html.

Theuwissen, "CMOS Image Sensors: State-of-the-Art," Solid-State Electronics, vol. 52, pp. 1401-1406, year 2008.

* cited by examiner

Sampling Error in Current Memory

Sampling Error Mitigation In Current Memory
By Double (Multiple) Sampling

FIGURE 8

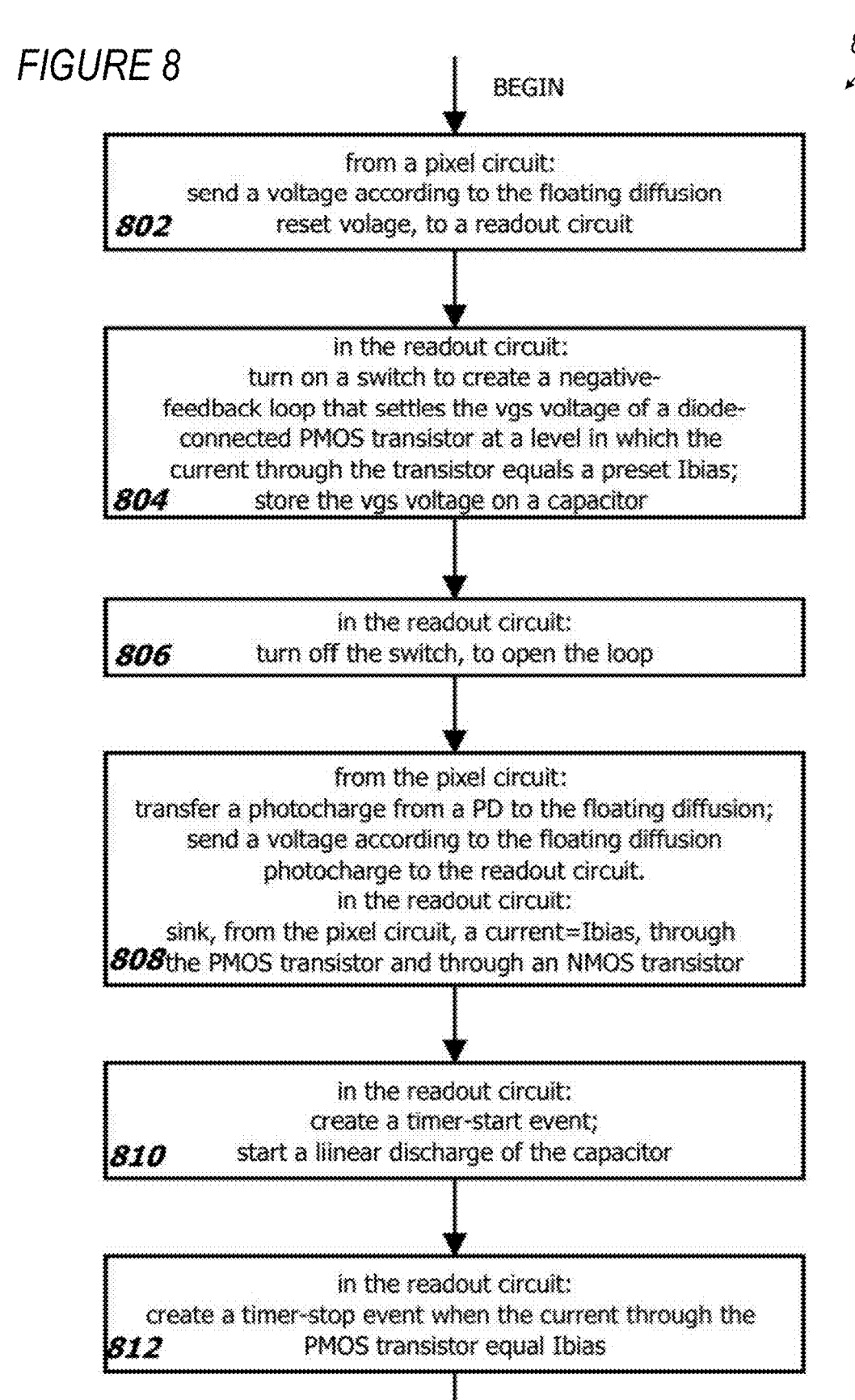

*800*

BEGIN

802
from a pixel circuit:
send a voltage according to the floating diffusion
reset volage, to a readout circuit

804
in the readout circuit:
turn on a switch to create a negative-
feedback loop that settles the vgs voltage of a diode-
connected PMOS transistor at a level in which the
current through the transistor equals a preset Ibias;
store the vgs voltage on a capacitor

806
in the readout circuit:
turn off the switch, to open the loop

808
from the pixel circuit:
transfer a photocharge from a PD to the floating diffusion;
send a voltage according to the floating diffusion
photocharge to the readout circuit.
in the readout circuit:
sink, from the pixel circuit, a current=Ibias, through
the PMOS transistor and through an NMOS transistor

810
in the readout circuit:
create a timer-start event;
start a liinear discharge of the capacitor

812
in the readout circuit:
create a timer-stop event when the current through the
PMOS transistor equal Ibias

END

FIGURE 9

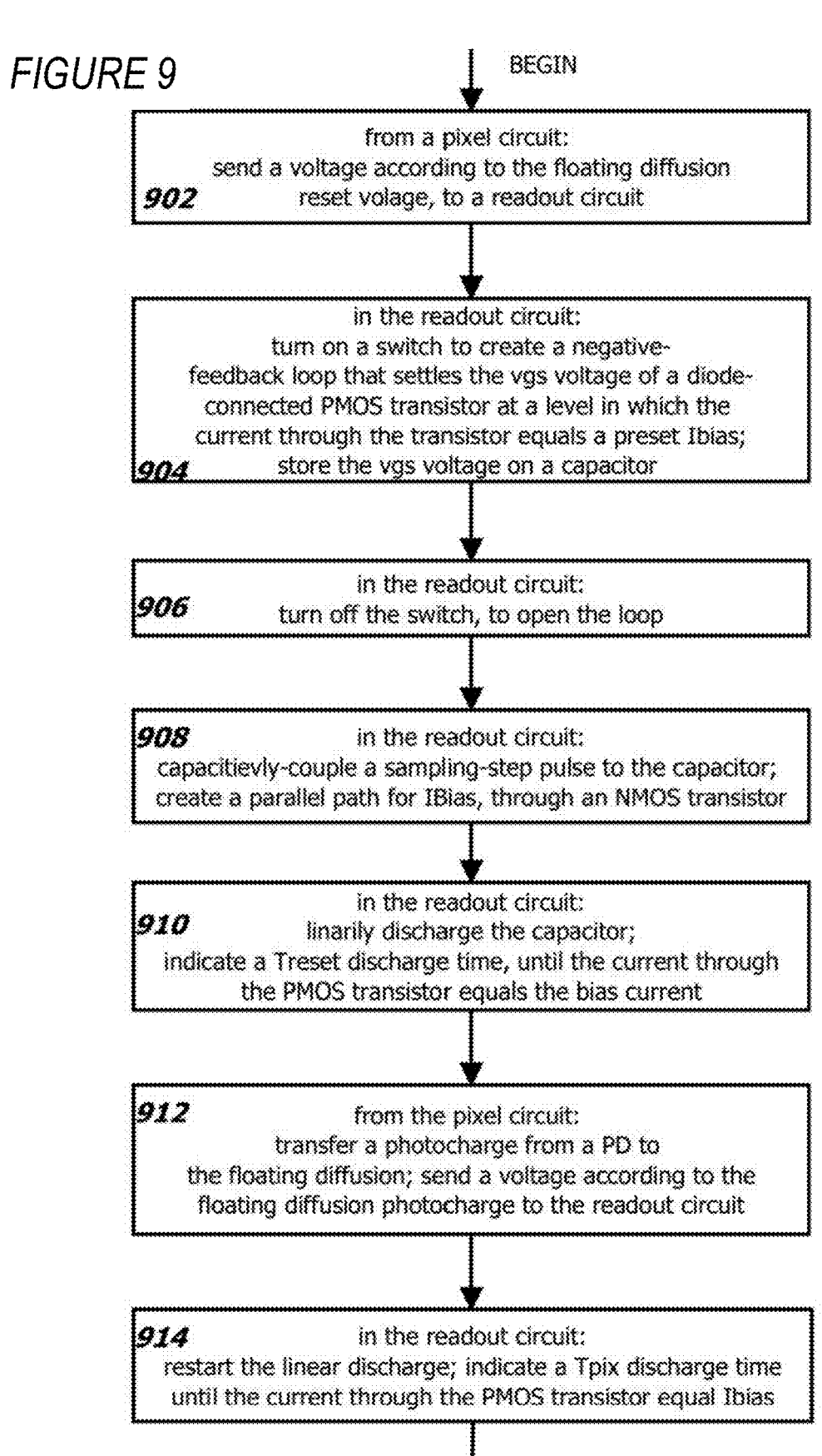

BEGIN

*900*

902
from a pixel circuit:
send a voltage according to the floating diffusion
reset volage, to a readout circuit

904
in the readout circuit:
turn on a switch to create a negative-
feedback loop that settles the vgs voltage of a diode-
connected PMOS transistor at a level in which the
current through the transistor equals a preset Ibias;
store the vgs voltage on a capacitor

906
in the readout circuit:
turn off the switch, to open the loop

908
in the readout circuit:
capacitievly-couple a sampling-step pulse to the capacitor;
create a parallel path for IBias, through an NMOS transistor

910
in the readout circuit:
linarily discharge the capacitor;
indicate a Treset discharge time, until the current through
the PMOS transistor equals the bias current

912
from the pixel circuit:
transfer a photocharge from a PD to
the floating diffusion; send a voltage according to the
floating diffusion photocharge to the readout circuit

914
in the readout circuit:
restart the linear discharge; indicate a Tpix discharge time
until the current through the PMOS transistor equal Ibias

END

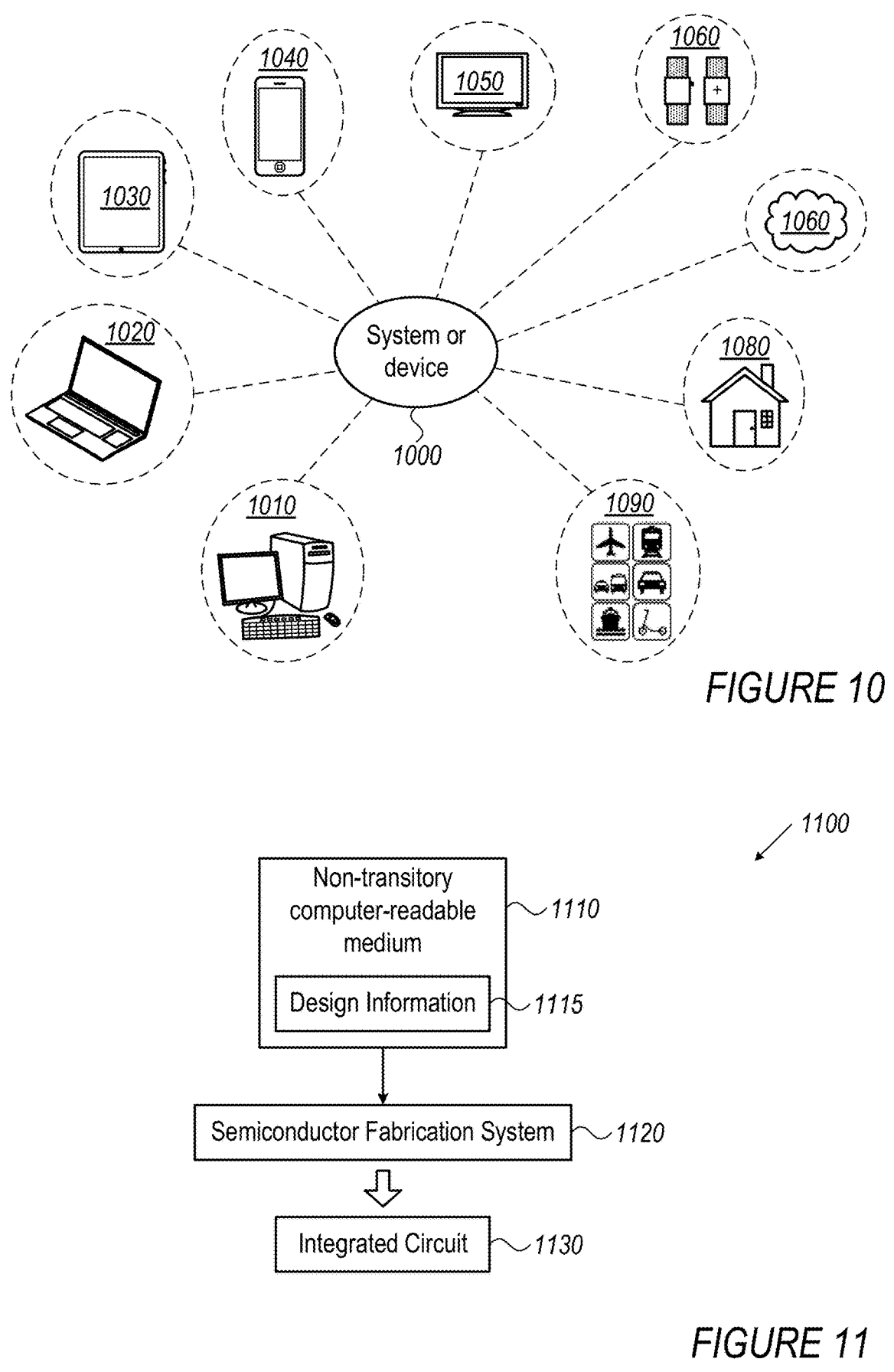

*1040*

*1050*

*1060*

*1030*

*1060*

*1020*

System or device

Non-transitory computer-readable medium — *1110*

Design Information — *1115*

Semiconductor Fabrication System — *1120*

Integrated Circuit — *1130*

*FIGURE 11*

LOW-POWER/SMALL-AREA CURRENT-MODE PIXEL READOUT CIRCUIT

CROSS-REFERENCE TO RELATED APPLICATIONS

This application claims the benefit of U.S. Provisional Patent Application 63/609,914, filed Dec. 14, 2023, whose disclosure is incorporated herein by reference.

FIELD OF THE DISCLOSURE

The present disclosure relates generally to imaging devices, and particularly to pixel readout circuits of imaging devices.

BACKGROUND OF THE DISCLOSURE

Pixel readout circuits typically comprise correlated-double-sampling techniques for switching noise reduction.

Some background may be found in U.S. Pat. No. 6,570,617, which discloses a single-chip camera including an integrated image acquisition portion and control portion and having double sampling/noise reduction capabilities thereon. Part of the integrated structure reduces the noise that is picked up during imaging.

U.S. Pat. No. 9,571,774 discloses a device comprising a pixel, a current source, and a readout circuit; wherein, during a first readout phase of the pixel, the readout circuit samples an output voltage of an output node of the pixel and an output current of the pixel is set by the current source; between the first and second readout phases the pixel is configured to change the output current to provide a second output current; the change of the output current is responsive to radiation sensed by a radiation sensor of the pixel during a sensing period; and, during a second readout phase the readout circuit samples the second output current while providing the sampled output voltage to the output node of the pixel.

Lastly, In "CMOS image sensors: State-of-the-art", Albert J. P. Theuwissen, Solid-State Electronics 52 (2008) 1401-1406 (doi:10.1016), the author gives an overview of the (then) state-of-the-art of Complementary Metal-Oxide Semiconductor (CMOS) image sensors, focusing on the shrinkage of the pixels: the effect on the performance characteristics of the imagers and on the various physical parameters of the camera, how the CMOS pixel architecture is optimized to cope with the negative performance effects of the ever-shrinking pixel size which, on the other hand, allow further integration on column level and even on pixel level.

SUMMARY

An embodiment that is described herein provides an imaging device including a pixel-circuit and a readout circuit. The pixel-circuit is configured to (i) transfer a reset charge of a photodetector to a storage node upon being reset, (ii) generate a reset output voltage according to the reset charge, (iii) accumulate electrical charge in the photodetector in response to incident light, (iv) transfer the accumulated electrical charge to the storage node, and (v) generate a pixel output voltage according to the accumulated charge stored in the storage node. The readout circuit is configured to (i) during a setup phase, charge a capacitor according to the reset output voltage, and (ii) during a measure phase, discharge the capacitor, and measure a discharge time until the charge on the capacitor is according to the pixel output voltage.

In some embodiments, the readout circuit is further configured, during the setup phase, to set the charge on the capacitor according to the reset output voltage and according to a preset bias current, and, during the measure phase, to measure the discharge time until the charge on the capacitor is according to the pixel output voltage and to the preset bias current.

In an embodiment, the readout circuit includes (i) a first Metal-Oxide Semiconductor (MOS) transistor that is configured to, during the setup phase, to form a closed loop that sets the charge on the capacitor according to the reset output voltage and according to a preset bias current, and (ii) a second MOS transistor that is configured to conduct, during the measure phase, the difference between the preset bias current and the current through the first MOS device.

In an example embodiment, the readout circuit includes a noise reduction circuit that is switched during the setup phase and is configured to reduce a switching noise that affects a voltage on the capacitor.

There is additionally provided, in accordance with an embodiment that is describe herein, an imaging device including a pixel-circuit and a readout circuit. The pixel-circuit includes a photodetector. The pixel-circuit is configured to (i) transfer a reset charge of the photodetector to a storage node upon being reset, (ii) generate a reset output voltage according to the reset charge, (iii) accumulate electrical charge in the photodetector in response to incident light, (iv) transfer the accumulated electrical charge to the storage node, and (v) generate a pixel output voltage according to the accumulated charge stored in the storage node. The readout circuit is configured to (i) store a first charge on a capacitor, according to the reset output voltage, (ii) apply an additional voltage step to the capacitor, so as to reach a second charge, (iii) discharge the capacitor from the second charge, and measure a reset discharge time, (iv) re-charge the capacitor to the second charge, (v) discharge the capacitor from the second charge until reaching a threshold that depends on the pixel output voltage, and measure a pixel discharge time, and (vi) calculate a digital corrected pixel value responsively to a difference between the pixel discharge time and the reset discharge time.

In a disclosed embodiment, the readout circuit is further configured to store the first charge on the capacitor according to the reset output voltage and according to a preset bias current.

In an embodiment, the readout circuit includes (i) a first Metal-Oxide Semiconductor (MOS) transistor that is configured to form a closed loop that sets the first and second charges according to the reset output voltage and according to a preset bias current, and (ii) a second MOS transistor that is configured to conduct a difference between the preset bias current and the current through the first MOS device.

In an embodiment, the readout circuit further includes a two cascade-connected N-channel MOS (NMOS) transistor that increase the negative gain of the closed-loop is increased, by adding an additional which adds an additional cascade gain to the loop that sets the charge on the capacitor.

There is also provided, in accordance with an embodiment that is describe herein, an imaging method including, using a pixel-circuit, (i) transferring a reset charge of a photodetector to a storage node upon being reset, (ii) generating a reset output voltage according to the reset charge, (iii) accumulating electrical charge in the photodetector in response to incident light, (iv) transferring the accumulated electrical charge to the storage node, and (v) generating a pixel output voltage according to the accumulated charge stored in the storage node. Using a readout circuit, (i) during a setup phase, a capacitor is charged according to the reset output voltage, and (ii) during a measure phase, the capacitor is discharged, and a discharge time, until the charge on the capacitor is according to the pixel output voltage, is measured.

There is further provided, in accordance with an embodiment that is describe herein, and imaging method including, using a pixel-circuit, (i) transferring a reset charge of a photodetector to a storage node upon being reset, (ii) generating a reset output voltage according to the reset charge, (iii) accumulating electrical charge in the photodetector in response to incident light, (iv) transferring the accumulated electrical charge to the storage node, and (v) generating a pixel output voltage according to the accumulated charge stored in the storage node. Using a readout circuit, (i) a first charge is stored on a capacitor, according to the reset output voltage, (ii) an additional voltage step is applied to the capacitor, so as to reach a second charge, (iii) the capacitor is discharged from the second charge, and (iv) a reset discharge time is measured. The capacitor is re-charged to the second charge. The capacitor is discharged from the second charge until reaching a threshold that depends on the pixel output voltage, and a pixel discharge time is measured. A digital corrected pixel value is calculated responsively to a difference between the pixel discharge time and the reset discharge time.

The present disclosure will be more fully understood from the following detailed description of the embodiments thereof, taken together with the drawings in which:

BRIEF DESCRIPTION OF THE DRAWINGS

FIG. 8 is a flowchart that schematically illustrates a low-power low-area A-CDS method for converting incident light to pixel value, in accordance with an embodiment that is disclosed herein;

FIG. 9 is a flowchart that schematically illustrates a low-power low-area D-CDS method for converting incident light to pixel value, in accordance with an embodiment that is disclosed herein;

FIG. 10 is a diagram that schematically illustrates various types of systems that may include any of the circuits, devices, or system discussed above, in accordance with embodiments that are described herein; and FIG. 11 is a block diagram illustrating an example non-transitory computer-readable storage medium that stores circuit design information, according to some embodiments that are described herein.

DETAILED DESCRIPTION OF EMBODIMENTS

Overview

Figure 1:
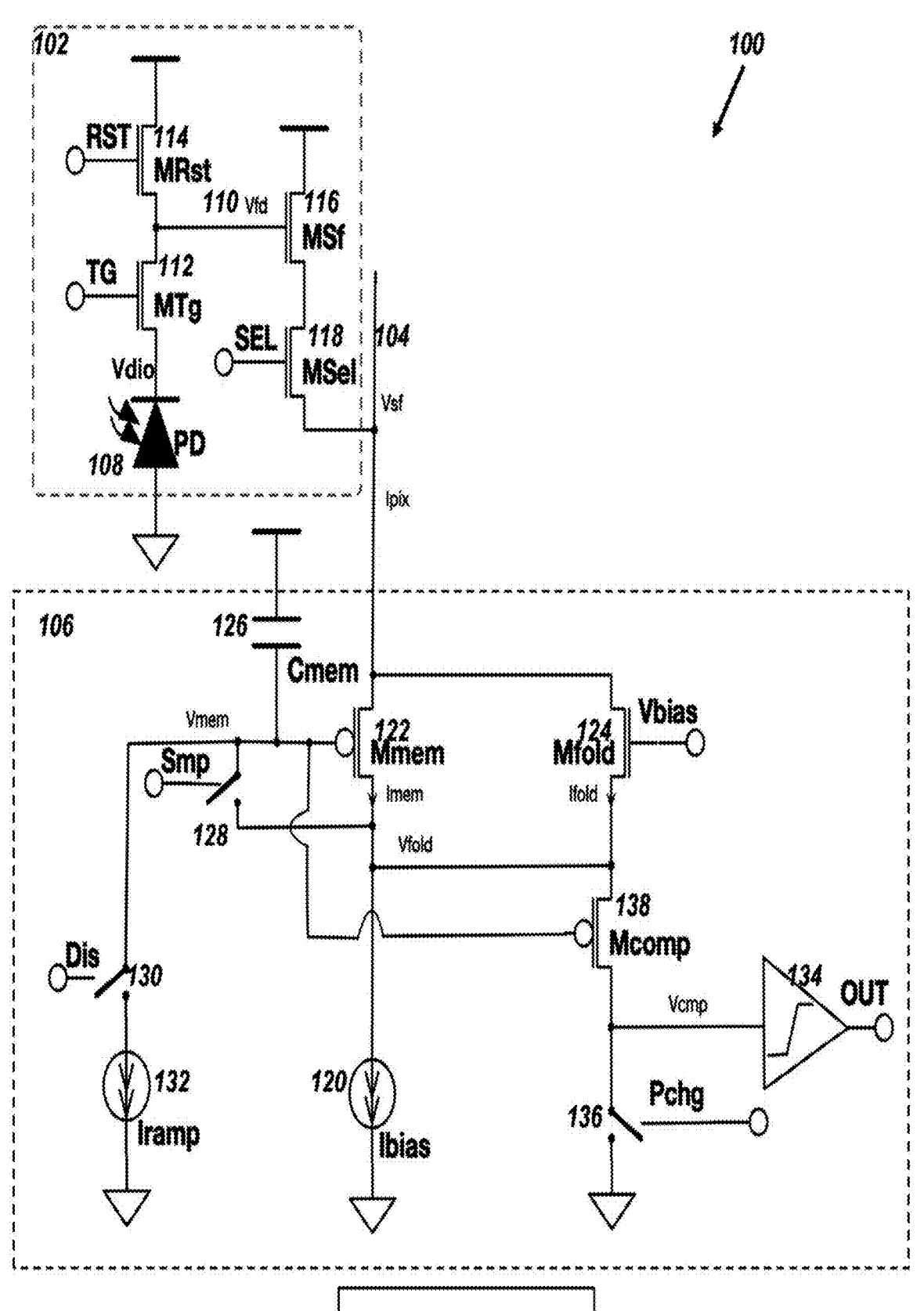
FIG. 1 is a block diagram that schematically illustrates an analog-correlated-double-sampling (A-CDS) Imaging Device, in accordance with an embodiment that is described herein.

CMOS imaging devices typically comprise pixel circuits, arranged in a matrix of rows and columns, and readout circuits. The pixel circuits include photodetectors that convert light into electrical charge (sometimes referred to as "photo-charge" hereinbelow) and, typically, circuitry to transfer the charge to a storage node and to output a signal, responsively to the voltage on the storage node, to column lines.

The readout circuits are coupled to the column lines and convert the signals that the pixel circuits output into pixel values. Typically, the imaging device includes means to convert the pixel value into digital form.

When the pixel value is derived from a voltage on the storage node, an initial storage node voltage may hinder the readout accuracy. To mitigate, the initial voltage (typically referred to as reset voltage) may be subtracted from the readout voltage value. When the temporal noise component of a sample is correlated to the temporal noise component of the next sample, this technique is referred to as Correlated Double Sampling, or CDS.

The output pixel value noise may comprise, for example, shot noise and thermal noise (possibly in addition to other noise sources such as $1/f$ noise, supply noise that propagates to the pixel, and many others).

Embodiments that are disclosed herein present imaging devices comprising small-area, low-power current-mode readout circuits.

In embodiments, the pixel circuit outputs a reset voltage followed by a pixel voltage; the readout circuit is configured to sink a preset Ibias current from the pixel circuit, set a capacitor voltage according to the pixel circuit output voltage, and then discharge the capacitor and derive the pixel value by measuring a discharge time. It should be noted that by Reset Voltage and Pixel Voltage we refer to voltages on the column line, which typically follow the corresponding voltages on the floating diffusion, shifted (down) by a gate-source voltage (the gate and source of the pixel circuit's source-follower transistor).

In an Analog-Correlated-Double-Sampling (A-CDS) embodiment, the readout circuit comprises a P-channel Metal-Oxide Silicon (PMOS) transistor that is connected to a fixed Ibias current source. When the pixel circuit outputs the reset voltage, a switch is closed to create a negative-feedback closed loop that settles the gate-source voltage of the PMOS transistor to a level that cause the PMOS transistor to conduct a current that is equal to Ibias from the pixel circuit. The switch then opens but the voltage remains stored on the capacitor. Next, when the pixel circuit outputs the pixel voltage, the PMOS transistor will turn off, and the current (Ibias) will be diverted to an NMOS transistor in a parallel path. Then, an Iramp current source linearly discharges the capacitor, until the current through the PMOS transistor, again, equals Ibias (and, hence, the NMOS transistor stops conducting). This trigger point is detected by a comparator; the discharge time until the trigger point is proportional to the CDS-corrected value of the photo-charge that was accumulated in the photodetector.

In a derivative A-CDS embodiment, the switching noise induced when the switch opens the closed loop is mitigated by a double (or multiple) switching technique; this technique will be described below, with reference to FIG. 3.

In a Digital-Correlated-Double-Sampling (D-CDS) embodiment, the readout circuit comprises a P-channel Metal-Oxide Silicon (PMOS) transistor that is connected to a fixed Ibias current source. When the pixel circuit outputs the reset voltage, a switch is closed to create a negative-feedback closed loop that settles the gate-source voltage of the PMOS transistor, which is stored on a Cmem capacitor, to a level that causes the PMOS transistor to conduct a current that is equal to Ibias from the pixel circuit. The switch then opens but the voltage remains stored on the Cmem capacitor.

Then, the control circuit injects, through a Cmem capacitive coupling, additional charge to the capacitor; this turns the PMOS transistor off, diverting part (or all) of Ibias to a parallel NMOS transistor. Now, an Iramp current source discharges the Cmem capacitor through a coupling capacitor; the current through the PMOS transistor rises, a first discharge time—Treset—is measured until the current reaches Ibias. Next, the ramp ends and Vmem is pushed high, through the coupling capacitor; the current through the PMOS transistor is, again, Ibias.

When the pixel circuit outputs the pixel voltage, the current through the PMOS transistor drops (Ibias is diverted to the parallel NMOS transistor). A new ramp now starts, increasing the current through the PMOS device; and a second discharge time—Tpixel, is measured until the current reaches Ibias. The D-CDS corrected pixel value is calculated by subtracting Tpixel from Treset (and multiplying the difference by a conversion constant).

In some derived embodiments, which may employ the A-CDS or the D-CDS circuits described above, the negative gain of the closed-loop is increased, by adding an additional NMOS transistor, which adds an additional cascade gain.

Thus, in embodiments, a simple readout circuit employing a relatively small area and consuming relatively low power can be used to build an imaging device.

Description of Embodiments

Embodiments that are disclosed herein describe image sensors comprising pixel circuits that convert incident light into voltage, and readout circuits that convert the pixel circuit's voltages into digital values.

We will describe hereinbelow embodiments comprising Analog-Correlated Double-Sampling (A-CDS) imaging devices with reference to FIGS. 1, 2, 3, 4 and 8, and Digital-Correlated-Double-Sampling (D-CDS) imaging devices with reference to FIGS. 5, 6 and 9. An improved feedback-gain technique, applicable to both A-CDS and D-CDS, will be described with reference to FIG. 7. Various types of systems that may include the disclosed circuits will be discussed with reference to FIG. 10 and, lastly, a computer storage that stores design information pertaining to the disclosed circuits will be discussed with reference to FIG. 11.

FIG. 1 is a block diagram that schematically illustrates an analog-correlated-double-sampling (A-CDS) Imaging Device 100, in accordance with an embodiment that is described herein. Imaging device 100 comprises a pixel circuit 102 that is connected to a column line 104, and a readout circuit 106. In embodiments, imaging device 100 comprises a plurality of pixel circuits, arranged in a matrix, comprising intersecting rows and columns, a plurality of column lines (typically one for each column), and a plurality of readout circuits (one or more for each column).

Pixel circuit 102 comprises a Photodetector (PD) 108 that is configured to accumulate electrical charge in response to incident light. According to the example embodiment illustrated in FIG. 1, PD 108 comprises a pinned photo diode; other suitable types of photodetectors may be used in alternative embodiments.

Pixel circuit 102 further comprises a Storage Node Vfd 110, a Transfer Transistor MTg 112, which is configured to transfer the charge accumulated on the photodetector to the storage node, a Reset Transistor MRst 114, which is configured to reset the storage node (and, through the transfer transistor, clear the charge accumulated on the photodetector), a Source-Follower-configured transistor 116 (MSf), which is configured to buffer the voltage on the storage node (SF transistor 116 will sometimes be referred to as Amplifier hereinbelow), and a Select Transistor MSel 118, which is configured to drive column-line 104 with the output of transistor Msf 116 (when driving the column-line, the voltage on the storage node is reduced by the Vgs of Msf 116 and the usually negligible voltage drop on Msel 118).

A plurality of pixel circuits may be connected to a single column line; typically, at any given time, the MSel transistor of only one pixel circuit in each column may be on, and, thus, a single pixel circuit in each column will drive the corresponding column line.

Storage-Node 110 is typically a floating diffusion (FD) and will sometimes be referred to as such hereinbelow. Other types of storage nodes, however, may be used in alternative embodiments.

Column line 104 is connected to a Readout Circuit 106. The readout circuit comprises a Current Source 120, that is configured to sink a preset current Ibias from column line 104, through a PMOS transistor Mmem 122 and through an NMOS transistor Mfold 124.

Readout Circuit 106 further comprises a capacitor Cmem 126 that is configured to sample and hold a voltage applied to the gate of Mmem 122. A switch Smp 128 is configured, when active, to form a negative feedback loop that sets Mmem gate voltage according to Ibias, and a switch Dis 130, is configured to, when active, discharge Cmem 126 through a current source Iramp 132, at a constant rate.

Lastly, Readout Circuit comprises a comparator 134 that compares an input voltage Vcmp to a preset threshold, a Switch Pchg 136 that is configured to, when active, reset Vcmp, and a PMOS transistor Mcomp 138 that is configured to transfer a voltage to Vomp.

Each of Switches 128, 130 and 136 typically comprises one or more suitably configured MOS transistors.

A-CDS Imaging Device 100 further comprises a Control Circuit 140, which is configured to send control signals to pixel circuit 102 and to readout circuit 106.

It should be noted that readout circuit 106, which works at a current mode, is relatively simple; Typically, the readout circuit consumes a small amount of power, and occupies a small silicon area, relative to conventional voltage-mode readout circuits.

We will now describe the operation of A-CDS Imaging device 100.

Figure 2:
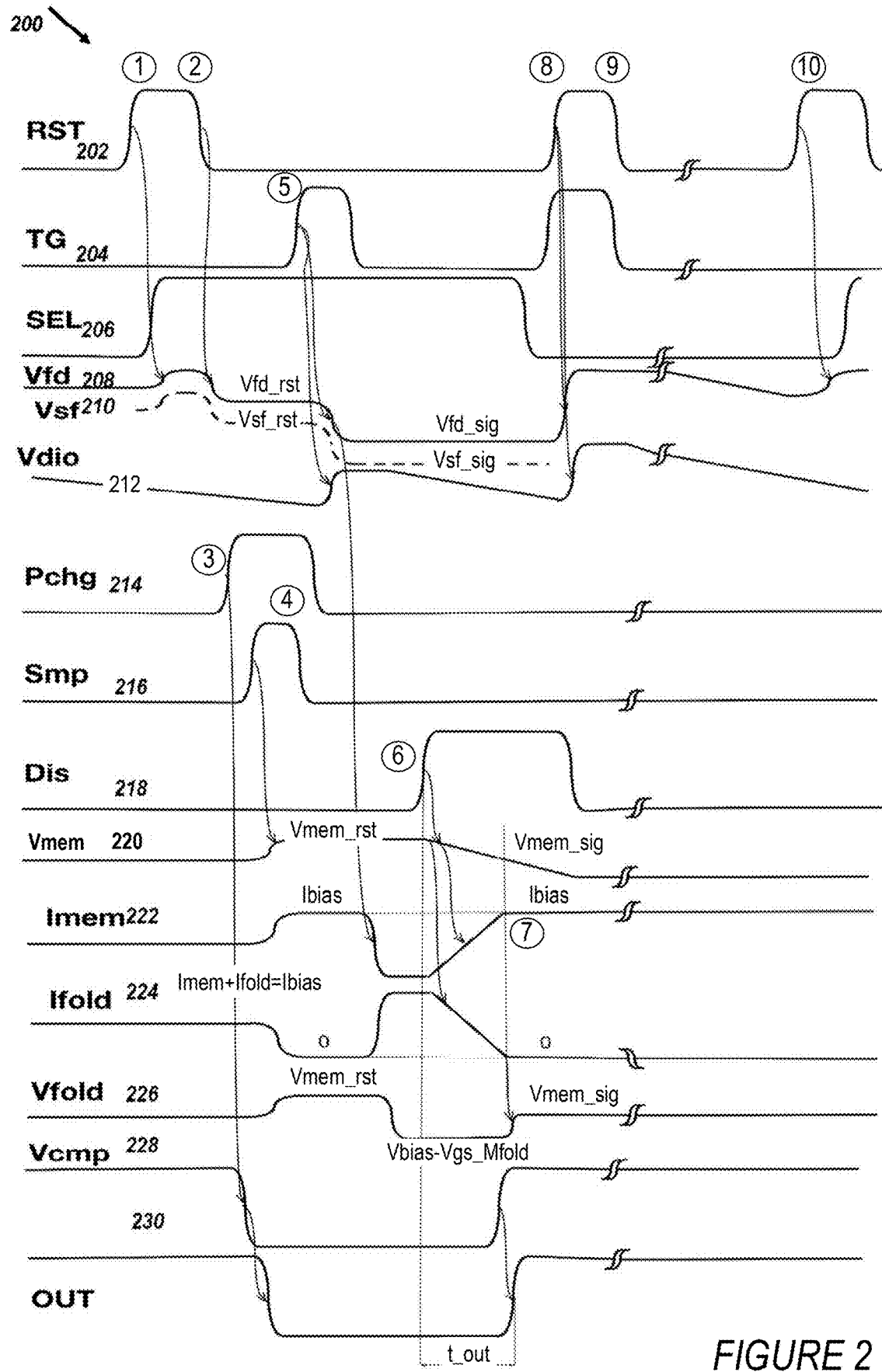
FIG. 2 is a timing diagram that schematically illustrates the timing waveforms of key signals of A-CDS Imaging Device, in accordance with an embodiment that is described herein.

FIG. 2 is a timing diagram that schematically illustrates the timing waveforms of key signals of A-CDS Imaging Device 100 (FIG. 1), in accordance with an embodiment that is described herein. All signals depicted in FIG. 2 refer to corresponding signals in FIG. 1.

Waveforms pertaining to the signals of Pixel Circuit 102 include: A graph 202, which illustrates the timing waveform of RST (Reset); a graph 204, which illustrates the timing waveform of TG (Transfer Gate); a graph 206, which illustrates the timing waveform of SEL (Select); a graph 208, which illustrates the timing waveform of Vfd (voltage on floating-diffusion 110); a graph 210, which illustrates the timing waveform of Vsf (Source Follower, or column line, voltage); and, a graph 212, which illustrates the timing waveform of Vdio (voltage on PD 108).

Waveforms pertaining to the signals of Readout Circuit 106 include: A graph 214, which illustrates the timing waveform of Pchg (Precharge—control of switch 136); a graph 216, which illustrates the timing waveform of Smp (Sample—control of switch 128); a graph 218 illustrates the timing waveform of Dis (Discharge-control of switch 130, which connects Iramp 132); a graph 220, which illustrates the timing waveform of Vmem (voltage on the gate of Mmem transistor 122); a graph 222, which illustrates the timing waveform of Imem (current through transistor 122); a graph 224, which illustrates the timing waveform of Ifold (current through transistor Mfold 124); a graph 226, which illustrates the timing waveform of Vfold (voltage on Vfold node); a graph 228, which illustrates the timing waveform of Vcmp (comparator 134 input voltage); and, a graph 230, which illustrates the timing waveform of OUT—the output of the readout circuit. Note that signals RST 202, TG 204, SEL 206, Pchg 214, Smp 216 and Dis 218 driven by Control Circuit 140, whereas the other signals depicted in FIG. 2 are voltages and currents on nodes and through paths within the A-CDS imaging device 100.

FIG. 2 comprises numbered circles, from 1 to 10, which define timepoints. We will refer below to the timepoints as timepoint 1 through timepoint 10. Note that signals RST 202, TG 204, SEL 206, Pchg 214, Smp 216, Dis 218 are driven by Control Circuit 140, whereas the other signals depicted in FIG. 2 are voltages and currents on nodes and through paths within the A-CDS imaging device.

Timepoint 1 is the beginning of the readout cycle; RST signal 202 goes high and the floating diffusion Vfd 110 is reset to the supply voltage. At timepoint 2 RST goes low; a charge feed-thru and a consequent charge injection occur, after which the floating diffusion voltage Vfd 208 settles to the reset value Vfd_rst (and pixel output Vsf follows, settling to Vsf_rst).

At timepoint 3, the Pchg 214 signal is pulsed high, pulling the comparator input node Vcmp 134 low. At timepoint 4, Smp 128 is pulsed to sample the reset voltage. When Smp is high, transistor Mmem 122 is connected as a diode, and the voltage on capacitor Cmem 126 is driven to a state in which the current Imem 222 converges to:

$$I_{mem} = I_{bias} = I_{pix}.$$

In embodiment, the value of Vbias is preset so that in this state Ifold=0. The gate-source voltage of Mmem transistor 122, is now:

$$Vgs_{mem}(I_{bias}) = V_{sfrst} - V_{memrst}.$$

On the falling edge of Smp 216, a sampling error affects the voltage Vmem_rst, including kTC, charge injection and feed-thru (technique for mitigating this error will be discussed below, with reference to FIG. 3).

At timepoint 5, TG signal 204 is pulsed, causing the photo-charge that has been accumulated on photodiode 108 to be fully transferred to the floating diffusion 110, which now settles to the signal value Vfd sig; the voltage on the column line will settle to Vis sig. Due to this voltage change, the current Ibias redistributes so that part (or all) of the current will flow through Mfold transistor 124 (Note that, of course, $$I_{mem} + I_{fld} = I_{bias} = I_{pix}).$$

At timepoint 6, Dis signal 218 goes high, connecting capacitor Cmem 126 to current source Iramp 132, which will now discharge the capacitor. The voltage Vmem 220 slopes down until, at timepoint 7, it reaches the trigger point at which the current Imem 222, again, equals Ibias (and, hence, Ifold 224 equals 0):

$$Vgs_{mem}(I_{bias}) = V_{sfsig} - V_{memsig}$$

Combining the two Vgsmem expressions above, we get:

$$V_{sf,st} - V_{sfsig} = V_{memrst} - V_{memsig}.$$

We can now calculate the time from the rising edge of Dis 218 to the trigger point as:

$$t_{out} = \frac{C_{mem}(V_{sfrst} - V_{sfsig})}{I_{ramp}}.$$

The output time is converted to a digital number by a digital counter (not shown).

When the readout is complete, SEL signal 206 and Dis signal 218 are low. At timepoint 8, RST signal 202 and TG signal 204 turn high, resetting photodiode PD 108. When RST and TG signals, again, return to low (at timepoint 9), the exposure (accumulation of photo-charge) starts. When the exposure is complete, the floating diffusion is reset again, and the next cycle of readout begins (timepoint 10 is timepoint 1 of the next cycle).

Sampling Error Reduction

Using double-sampling, the switching noise, including feedthrough, charge injection and/or kTC noise, that is induced into capacitor 126, can be reduced.

Figure 3:
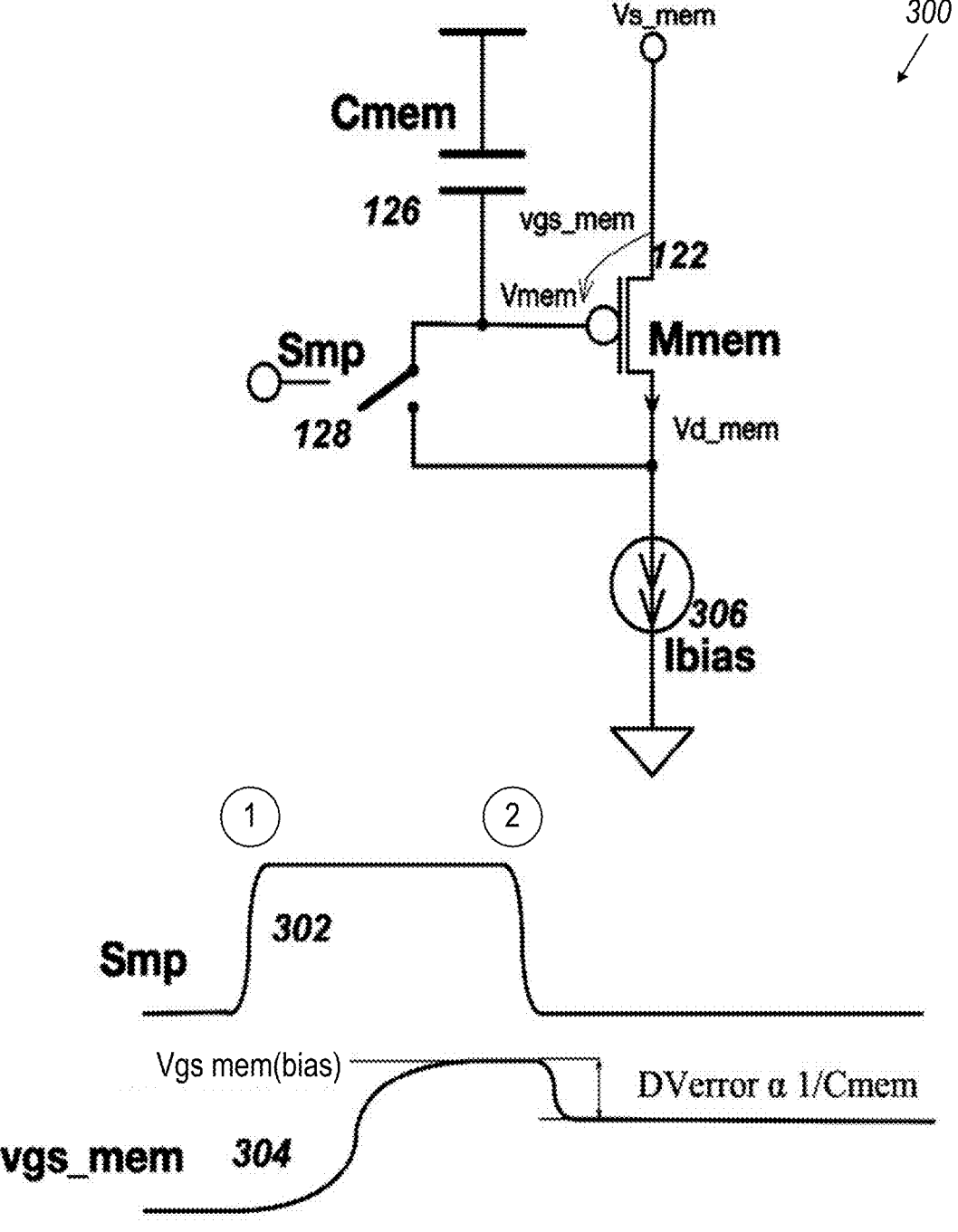
FIG. 3 is a block diagram that schematically illustrates a sampling error reduction circuit, in accordance with an embodiment that is described herein.
Figure 3:
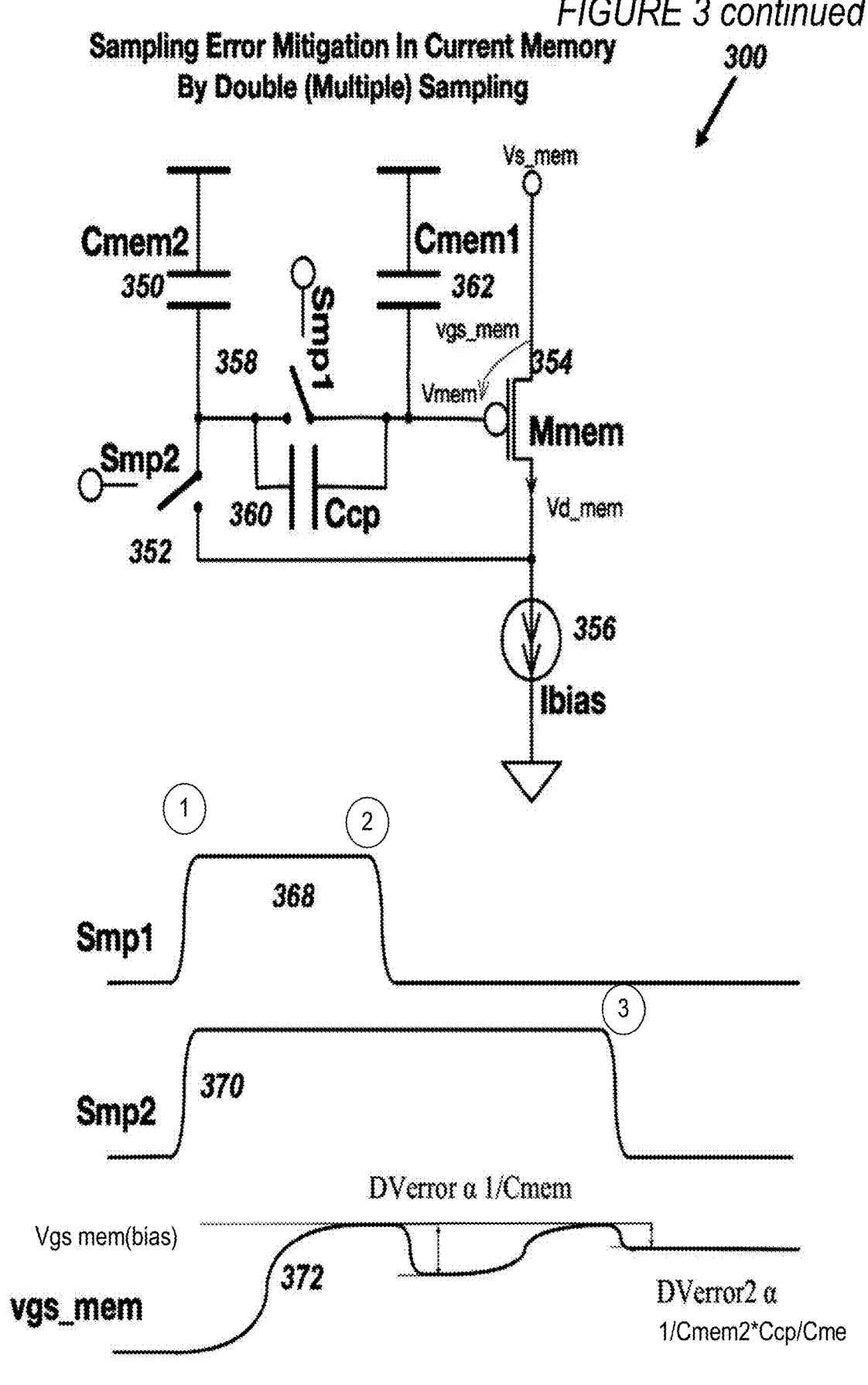

FIG. 3 is a block diagram that schematically illustrates a sampling error reduction circuit 300, in accordance with an embodiment that is described herein. When the noise reduction circuit is not used, Smp switch 128, when turning-off, injects noise to Cmem 126 (FIG. 1). The error, or the injected noise, is inversely proportional to the size of the capacitor. The relevant components of FIG. 1 are redrawn in FIG. 3, with the corresponding waveforms—an Smp waveform 302 and a vgs_mem waveform 304.

As can be seen, When Smp 128 is high (the switch is closed), Mmem transistor 122 is connected as a diode and a negative feedback drives the circuit to a state in which the gate-source voltage of transistor Mmem 122 fits an Ibias drain-to-source current. When Smp 128 goes low, an error DVerror is induced, inversely proportional to the size of the capacitor. One way to reduce the noise is to have a large Cmem capacitor (and, accordingly, a large Ibias current source 306); this improvement, however, increases both the power consumption and the silicon area of the readout circuit.

Alternatively, the double-sampling circuit illustrated in FIG. 3 (at the right) may be used. The circuit comprises a capacitor Cmem2 350, a switch Smp2 352, an Mmem transistor 354, an Ibias current source 356, a switch Smp1 358, and a capacitor Ccp 360. Control Circuit 140 (FIG. 1) drives Smp1 and Smp2. A waveform Smp1 368 illustrates the voltage on Smp1 (Smp1 switch control signal), a waveform Smp2 370 illustrates the voltage on Smp2 (Smp1 switch control signal), and a waveform vgs_mem 372 illustrates the gate-to-source voltage on Mmem transistor 354. The sequence of operations is as follows (see circled numbers in the figure):

1. SMP1 368 and Smp2 370 turn high; Mmem transistor 354 is connected as a diode and a negative feedback drives the circuit to the state in which the gate-source voltage of the device corresponds to Ibias.
2. When Smp1 goes low, an error DVerror1 is induced, inversely proportional to the size of the capacitor Cmem1 362. As Smp2 is still high, the feedback loop is still active via the coupling capacitor Ccp 360 and the loop, again, converges to the state in which the gate-source voltage of the device corresponds to Ibias.
3. When Smp2 370 goes low, an error DVerror2 is induced, inversely proportional to the size of the capacitor Cmem2 350, but reflected to Mmem transistor 354 via the capacitive divider formed by Ccp capacitor 360 and Cmem1 capacitor 362 and Cmem2 capacitor 350.
4. Thus $$DV_{error2} \propto \frac{C_{cp}}{C_{mem1} * C_{mem2}}.$$

In alternative disclosures, this technique may be extended to multiple sampling by forming a longer capacitor/switch chain.

Figure 4:
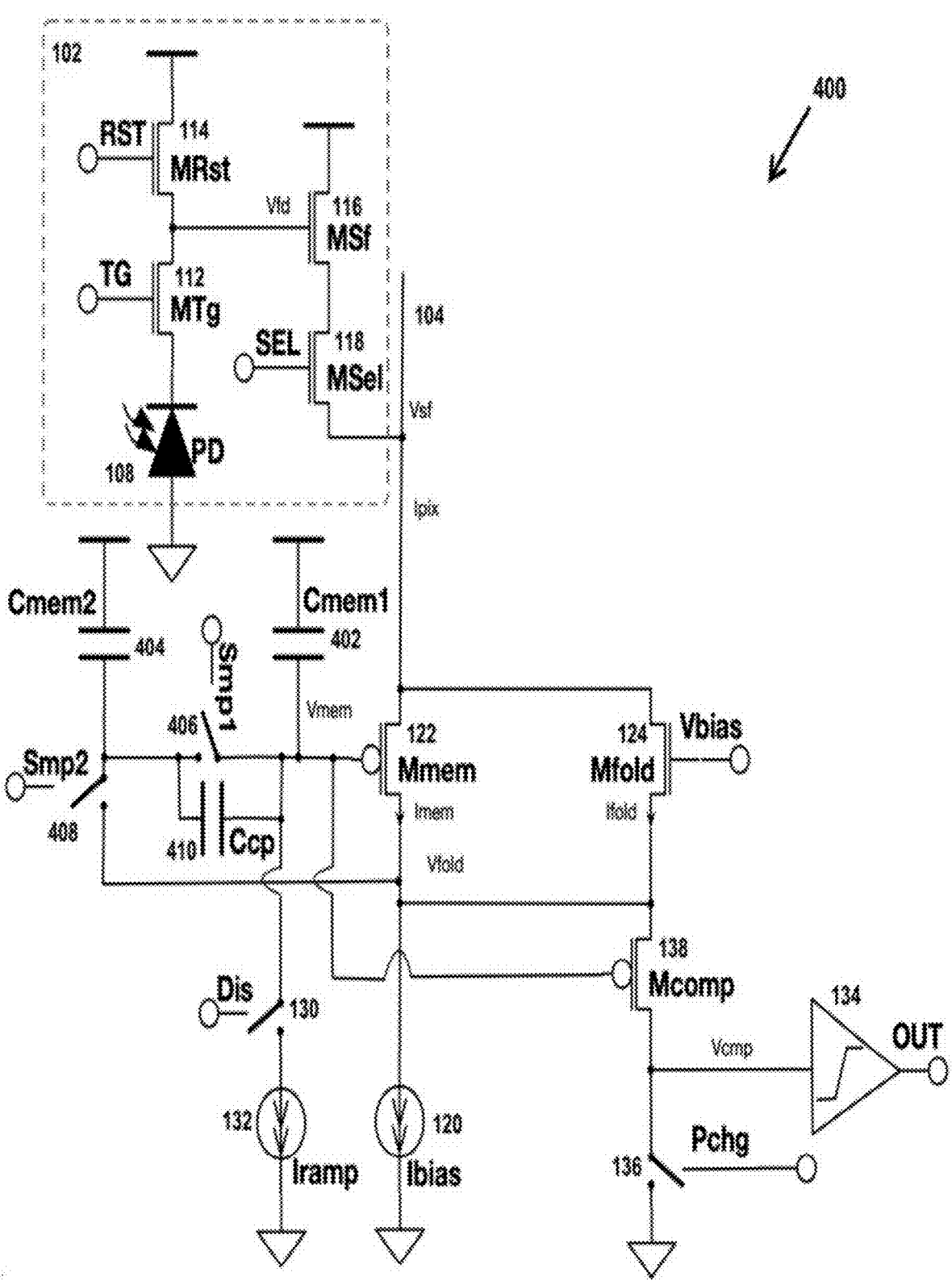
FIG. 4 is a block diagram that schematically describes double-sampling noise reduction in an A-CDS Imaging Device, in accordance with an embodiment that is disclosed herein.

FIG. 4 is a block diagram that schematically describes double-sampling noise reduction in an A-CDS Imaging Device 400, in accordance with an embodiment that is disclosed herein. A-CDS Imaging Device 400 is like A-CDS Imaging Device 100 (FIG. 1), except that Smp switch 128 and Cmem capacitor 126 are not implemented. Instead, imaging device 400 employs the double-sampling circuitry described above, including a capacitor Cmem1 402, a capacitor Cmem2 404, a switch Smp1 406, a switch Smp2 408 and a capacitor Ccp 410.

Figure 5:
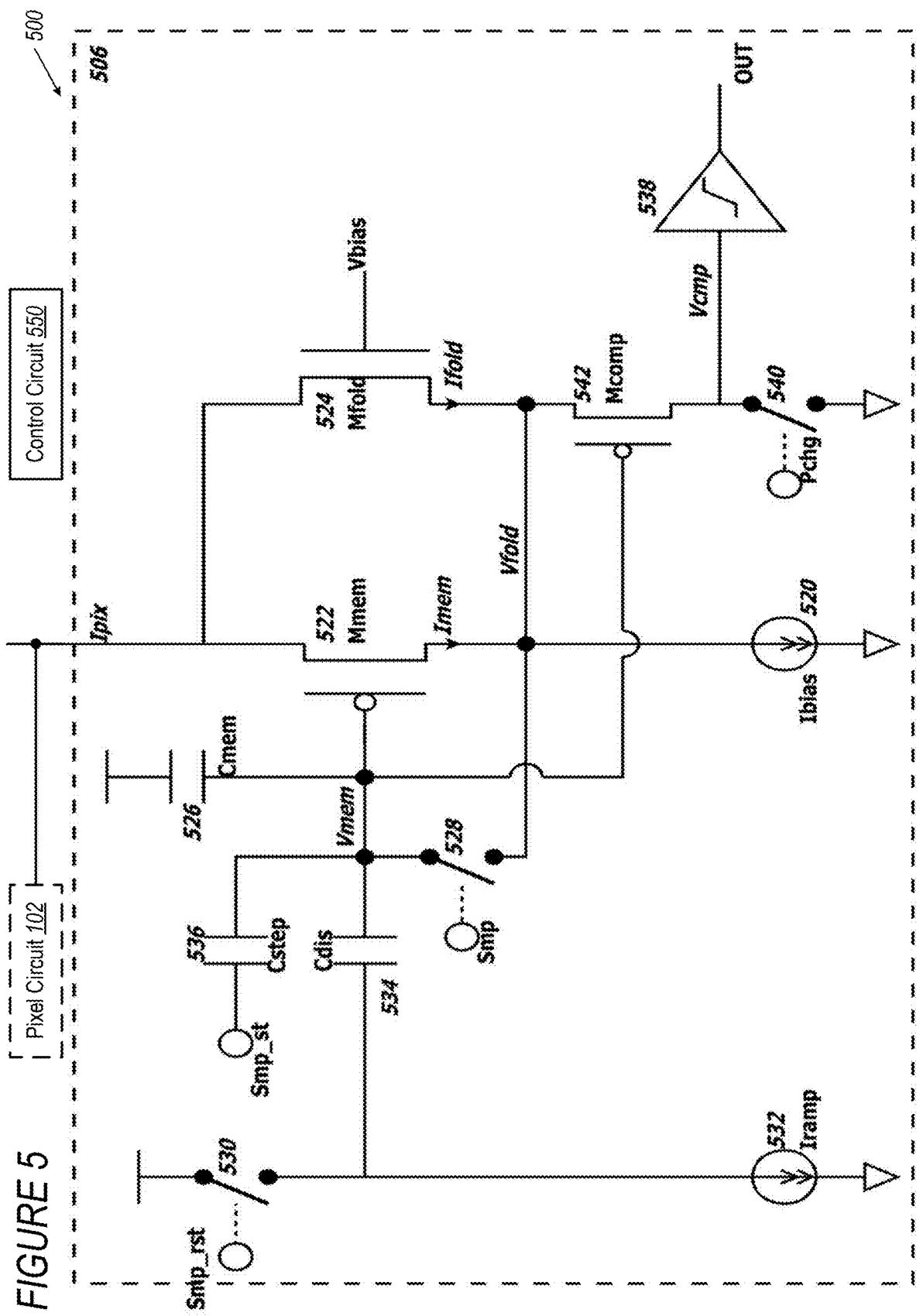
FIG. 5 is a block diagram that schematically illustrates a digital-correlated-double-sampling (D-CDS) Imaging Device, in accordance with an embodiment that is described herein.

FIG. 5 is a block diagram that schematically illustrates a digital-correlated-double-sampling (D-CDS) Imaging Device 500, in accordance with an embodiment that is described herein. Imaging device 500 comprises a pixel circuit 102 (that was described with reference to FIG. 1), connected to a column line 504, and a readout circuit 506. In embodiments, imaging device 500 comprises a plurality of pixel circuits, arranged in a matrix, comprising intersecting rows and columns, a plurality of column lines (typically one for each column), and a plurality of readout circuits (one or more for each column line).

Column line 504 is connected to Readout Circuit 506. The readout circuit comprises an Ibias Current Source 520, that is configured to sink a preset current Ibias from column line 504, through a PMOS transistor Mmem 522 and through an NMOS transistor Mfold 524.

Readout Circuit 506 further comprises a capacitor Cmem 526 that is configured to sample and hold a voltage applied to the gate of transistor Mmem 522, and a switch Smp 528 that is configured, when active, to form a negative feedback loop that sets transistor Mmem 522 gate voltage to fit an Ibias drain-source current.

Readout Circuit 506 further comprises a switch Smp_rst 530, a current source Iramp 532, a Cdis capacitor 534 and a Cstep capacitor 536. As will be described below (with reference to FIG. 6), capacitors Cstep 536 and Cdis 534 are configured to charge and discharge Vmem, respectively, from an Smp_st control, and from a positive power supply or the Iramp current source.

Lastly, Readout Circuit 506 comprises a comparator 538 that compares an input voltage Vomp to a preset threshold, a Switch Pchg 540 that is configured to, when active, reset Vcmp, and a PMOS transistor Mcomp 542 that is configured to transfer a voltage to Vcmp.

Each of Switches 528, 530 and 540 typically comprises one or more suitably configured MOS transistors.

D-CDS Imaging Device 500 further comprises a Control Circuit 550, which is configured to send control signals to pixel circuit 102 and to readout circuit 506.

It should be noted that readout circuit 506, which works at a current mode, is relatively simple; Typically, the readout circuit consumes a small amount of power, and occupies a small silicon area, relative to conventional voltage-mode readout circuits.

We will now describe the operation of D-CDS Imaging device 500.

Figure 6:
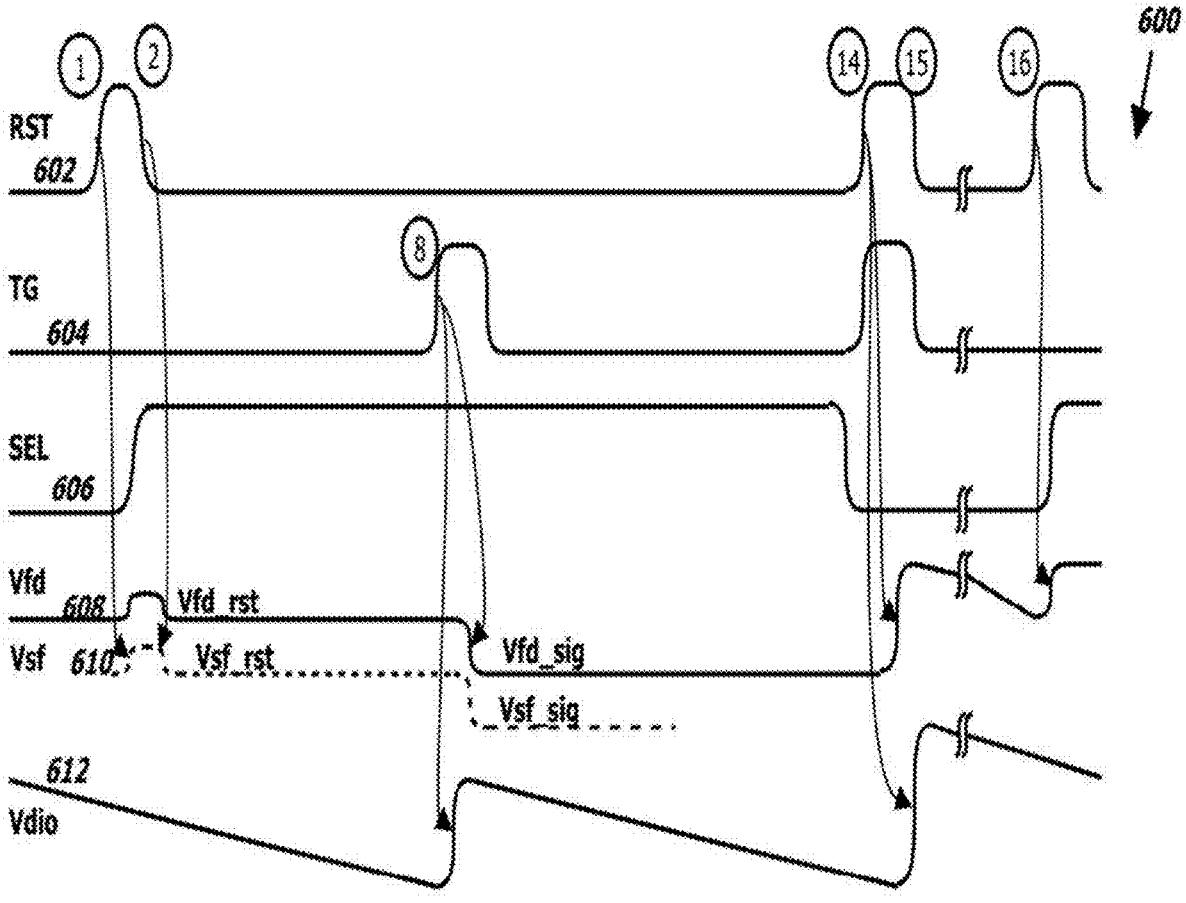
FIG. 6 is a timing diagram that schematically illustrates the timing waveforms of key signals of a D-CDS Imaging Device, in accordance with an embodiment that is described herein.
Figure 6:
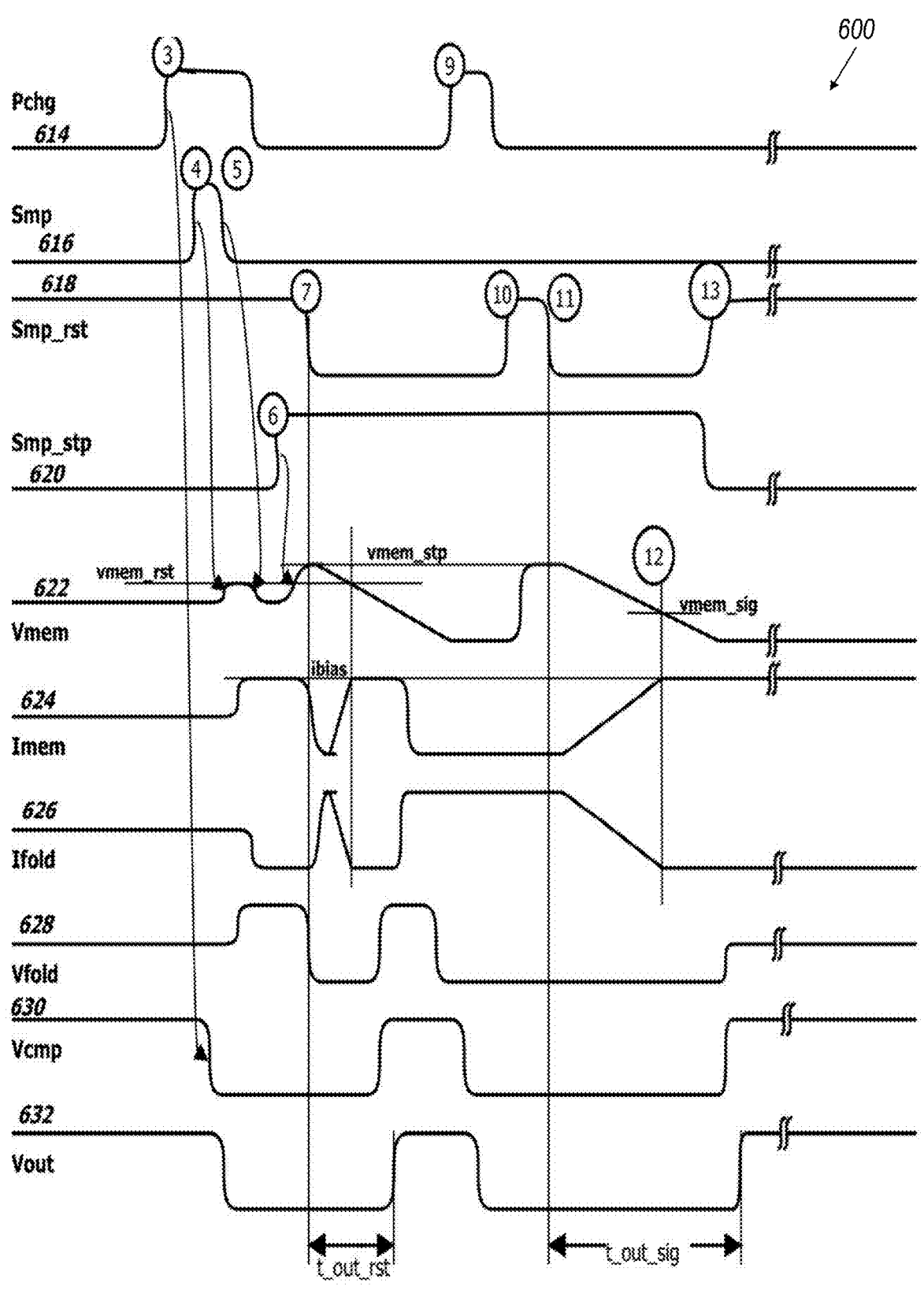

FIG. 6 is a timing diagram that schematically illustrates the timing waveforms of key signals of a D-CDS Imaging Device 500 (FIG. 5), in accordance with an embodiment that is described herein.

Waveforms pertaining to the signals of Pixel Circuit 102 include: A graph 602, which illustrates the timing waveform of RST (Reset); a graph 604, which illustrates the timing waveform of TG (Transfer Gate); a graph 606, which illustrates the timing waveform of SEL (Select transistor); a graph 608, which illustrates the timing waveform of Vfd (voltage on floating-diffusion 110); a graph 610, which illustrates the timing waveform of Vsf (Source Follower, or column line, voltage); and a graph 612, which illustrates the timing waveform of Vdio (voltage on PD 108).

Waveforms pertaining to the signals of Readout Circuit 506 include: A graph 614, which illustrates the timing waveform of Pchg (Precharge—control of switch 540); a graph 616, which illustrates the timing waveform of Smp (Sample—control of switch 528); a graph 618 illustrates the timing waveform of Smp_rst (control of Smp_rst switch 530); a graph 620, which illustrates the timing waveform of Smp_stp (control input applied at capacitor Cstep 536 terminal); a graph 622, which illustrates the timing waveform of Vmem (voltage at the gate of transistor Mem 522); a graph 624, which illustrates the timing waveform of Imem (current through transistor 522); a graph 626, which illustrates the timing waveform of Ifold (current through transistor 524); a Mfold graph 628, which illustrates the timing waveform of Vfold (voltage on Vfold node); a graph 630, which illustrates the timing waveform of Vcmp (comparator 538 input voltage); and, a graph 632, which illustrates the timing waveform of OUT—the output of the readout circuit.

FIG. 6 comprises numbered circles, from 1 to 16, defining time-points, from a timepoint 1 to a timepoint 16. Note that signals RST 602, TG 604, SEL 606, Pchg 614, Smp 616, Smp_rst 618, Smp_stp 620 are driven by Control Circuit 640, whereas the other signals depicted in FIG. 6 are voltages and currents on nodes and through paths within the D-CDS imaging device 500.

Timepoint 1 is at the beginning of the readout cycle; RST 602 goes high and the floating diffusion voltage 608 is reset to the supply voltage. At timepoint 2, RST 602 goes low, and a charge feed-thru/charge injection event occurs after which the floating diffusion voltage settles to the reset value Vfd_rst (Vsf 610 follows, settling to Vsf_rst).

At timepoint 3, Pchg 614 is pulsed high, pulling the comparator input node Vcmp 630 and, consequently, the output Vout 632, low. At timepoint 4 Smp 616 goes high, to sample the reset state. Note that this is done while Smp_rst 618 is high so that capacitor Cdis 534 and current source Iramp 532 are shorted to the positive supply. When Smp 616 is high, transistor Mmem 522 is connected as a diode and the voltage on capacitor Cmem 526 is driven to a state in which the current Imem 624 converges to:

$$I_{mem} = I_{bias} = I_{pix}.$$

The value of $V_{bias}$ is chosen so that in this state $I_{fold}=0$. The gate source voltage of transistor Mmem 522 in this state is:

$$Vgs_{mem}(I_{bias}) = V_{sfrst} - V_{memrst}.$$

On the falling edge of Smp 616 (timepoint 5), a sampling error affects the voltage Vmem_rst (kTC, charge injection, feed-thru). As will be shown, this error is mitigated and, hence, double- or multiple-sampling techniques for noise reduction, like the one described above (with reference to FIG. 3), are not needed.

At timepoint 6 Smp_stp signal goes high (from 0 to Vdd or to any other suitable voltage level; for simplicity we assume here that it is Vdd). As a result, Vmem 622 settles to a value Vmem_stp>Vmem_rst. Due to this voltage change, the current Ibias redistributes so that part (or all) of it will flow through Mfold transistor 524, respecting the equation:

$$I_{mem} + I_{fld} = I_{bias} = I_{pix}.$$

At timepoint 7 Smp_rst 618 goes low, starting the ramp for analog to time conversion of the reset value. When Vmem 622 again reaches the value Vmem_rst, the current through transistor Mmem 522 is Ibias, the current through transistor Mfold 524 is 0 and the comparator is triggered. The conversion time for the reset value is given by:

$$t_{outrst} = \frac{(C_{mem} + C_{step})(V_{memstp} - V_{memrst})}{I_{ramp}}.$$

The output time is converted to a digital number by measuring it with a digital counter (not shown).

The digital number, assuming the counter runs at a clock frequency folk, is given by:

$$N_{outrst} = \lfloor r_{outrst} * f_{clk} \rfloor.$$

At timepoint 8, TG 604 is pulsed, fully transferring the photo-charge accumulated by photodiode PD 108 (FIG. 1) to the floating diffusion 110; Vfd 608 now settles to the signal value Vfd sig and Vsf 610 settles to Vis sig. Due to this voltage change, the current Ibias redistributes so that part (or all) of it will flow through transistor Mfold 524, respecting the equation:

$$I_{mem} + I_{fld} = I_{bias} = I_{pix}.$$

At timepoint 9, Pchg 614 is pulsed high, pulling the comparator input node Vcmp and the output low. The output comparator is now ready.

At timepoint 10, Smp_rst 618 goes high connecting capacitor Cdis 534 and current source Iramp 532 back to the positive supply. Since the Vmem node has been isolated (and, hence, its total charge remains unchanged), the voltage on the Vmem node will settle back to Vmem_stp.

At timepoint 11 Smp_rst 618 goes low starting the ramp for the conversion of the signal value; at timepoint 12 a trigger point is reached, at which the current Imem 624 is equal, again, to Ibias (and the current Ifold 626 equals 0):

$$Vgs_{mem}(I_{bias}) = V_{sfsig} - V_{memsig}$$

Combining this equation with the Vgs expression above (at timepoint 4), we get $$V_{sfrst} - V_{sfsig} = V_{memrst} - V_{memsig}$$

We next calculate the time from the rising edge of Dis to the trigger point as:

$$t_{outsig} = \frac{(C_{mem} + C_{step})(V_{memstp} - V_{memsig})}{I_{ramp}}.$$

The output time is converted to a digital number by counting the time interval with a digital counter (not shown). The digital number, assuming the counter runs at a clock frequency folk, is given by:

$$N_{outsig} = \lfloor t_{outsig} * f_{clk} \rfloor.$$

applying the equivalence shown between Vmem and Vsf we get:

$$N_{out} = N_{outsig} - N_{outrst} \approx \left\lfloor \frac{(C_{mem} + C_{step})(V_{sfrst} - V_{sfsig})}{I_{ramp}} \right\rfloor.$$

It should be noted that, as the value of Vmem_stp has been cancelled out, the sampling error has been cancelled as well.

At time point 13 Smp_rst 618 goes high, Smp_stp 620 goes low and SEL 606 goes low marking the end of the readout cycle and preparing for the next readout.

At timepoint 14 RST 602 and TG 604 turn high, resetting PD 108 (FIG. 1).

When, at timepoint 15, RST 602 and TG 604 turn low, the exposure (accumulation of photo-charge) restarts, and when the exposure is complete, at time point 16 the floating diffusion is reset again, and the next cycle of readout begins.

Increased Loop Gain

In some embodiments, an improved readout circuit with an increased loop gain can be used. This technique will be described below in a D-CDS imaging circuit; however, the technique is not limited to D-CDS, and may also be used in A-CDS imaging circuits.

Figure 7:
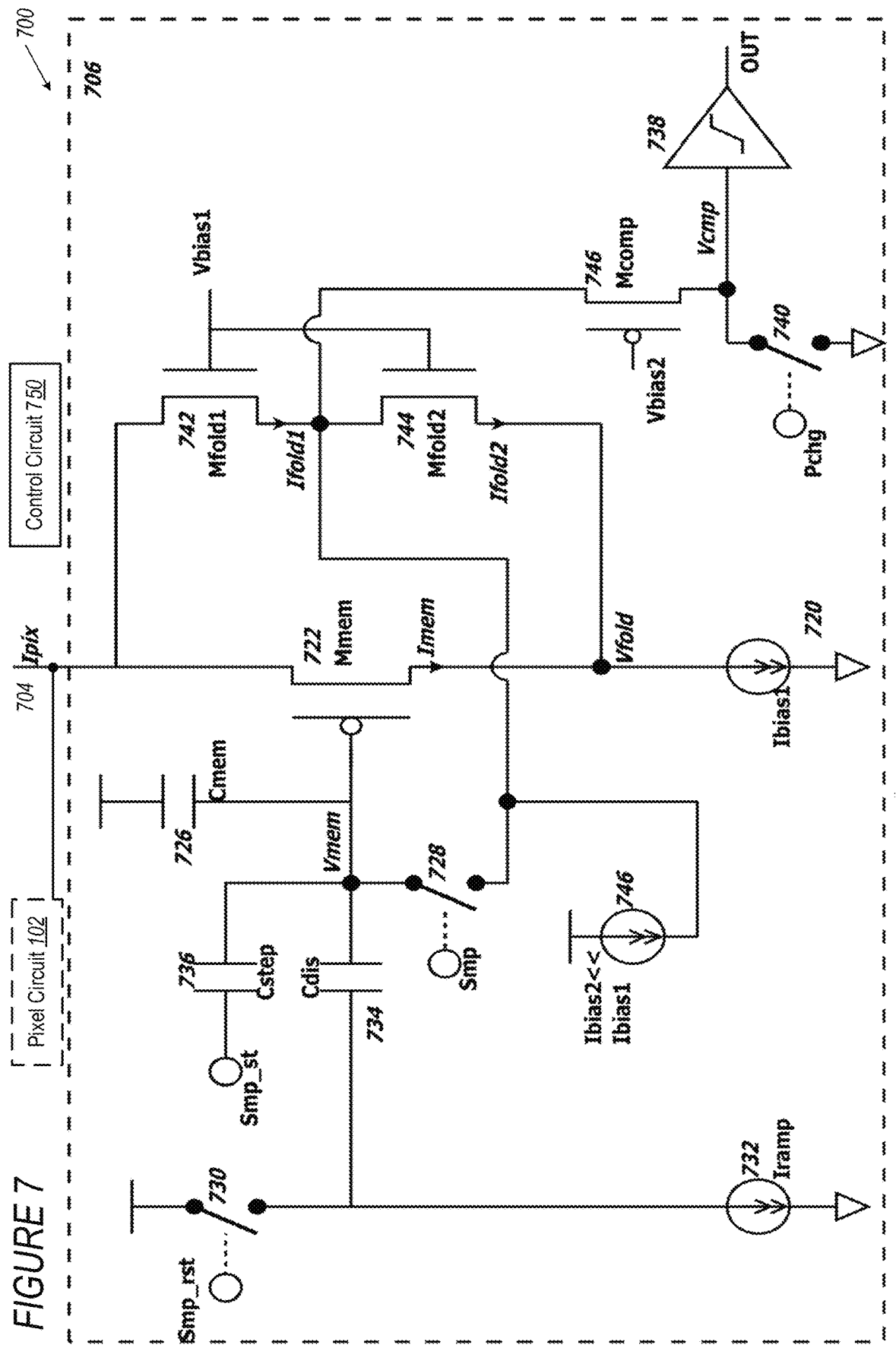
FIG. 7 is a block diagram that schematically illustrates an increased-loop-gain D-CDS imaging circuit, in accordance with an embodiment that is disclosed herein.

FIG. 7 is a block diagram that schematically illustrates an increased-loop-gain D-CDS imaging circuit 700, in accordance with an embodiment that is disclosed herein. Imaging Circuit 700 is similar to D-CDS imaging circuit 500 (FIG. 5), and includes a pixel circuit 102 (FIG. 1), a column line 704, a readout circuit 706, an Ibias1 current source 720, a PMOS transistor Mem 722, a capacitor Cmem 726, an Smp_rst switch 730, an Iramp current source 732, a Cdis capacitor 734, a Cstep capacitor 736, a Comparator 738, a Pchg switch 740, and a PMOS transistor Mcomp 742. The signals are controlled by a Control Circuit 750 (FIG. 5).

Mfold transistor 524 (FIG. 5), however, is replaced by an NMOS transistor Mfold1 742, and an NMOS transistor Mfold2 744; the gates of both transistors are connected to a Vbias voltage source; the drain of transistor 742 is connected to the source of transistor 744, to current source Ibias2 746 and, through switch 728, to the Vmem node. Transistor Mfold2 744 is connected to transistor Mcomp 746. In embodiments, Ibias2<<Ibias1.

Vbias1 is chosen so that (at the current sampling point) Mfold1 is cutoff and Ifold1=0.

Mfold2 conducts the bias current Ibias2, and, when switch 728 is on, the current Ipixel=Imem=Ibias1−Ibias2. The negative feedback path now has an additional cascade gain provided by Mfold2:

$$gm\_Mfold2*(Rout\_Mfold2||Rout\_Ibias2).$$

By moving Mcomp from the folding node to the cascade point, the headroom limitation of the readout circuit is improved as well as the voltage swing of the Vcmp node.

Methods

FIG. 8 is a flowchart 800 that schematically illustrates a low-power low-area A-CDS method for converting incident light to pixel value, in accordance with an embodiment that is disclosed herein. The flowchart is executed by a control circuit 140, which controls devices in pixel circuit 102 and readout circuit 106 (all shown in FIG. 1).

The flowchart starts at a Send Reset Voltage operation 802, wherein the control circuit applies a Select pulse to couple a select transistor to a column line; consequently, the pixel circuit applies a voltage on the column line, which is input to a readout circuit. The voltage level equals the voltage on a floating diffusion, minus the gate-drain drop of the select transistor.

At a subsequent Close Feedback Loop operation 804, the Control Circuit turns on a switch, to create a negative feedback loop, including a PMOS transistor that is connected as a diode; the loop settles the gate voltage of the PMOS transistor to a level in which the current is equal to a preset Ibias. This voltage is stored on a capacitor.

Then, at an Open-Loop operation 806, the control circuit opens the loop; the charge on the capacitor is maintained (but may include a noise, injected during the switching; in some embodiments the noise is mitigated using double-sampling techniques, such as the one described above, with reference to FIG. 4).

At a Send Pixel Voltage operation 808, the control circuit activates the Transfer and the Select controls, causing a full charge transfer from the photodetector to the floating diffusion and applying a corresponding voltage on the column line. The voltage level equals the voltage on the floating diffusion, minus the gate-drain drop of the select transistor. The current from the pixel circuit remains Ibias, part of it flowing through the PMOS transistor and the remainder through a suitably biased NMOS transistor.

Now, at a Timer-Start operation 810, the control circuit activates a discharge switch, and indicates a timer-starts event. The capacitor is now linearly discharged.

Lastly, at a Timer-Stop operation 812, the current through the transistor is equal (again) to Ibias; this is detected by a comparator in the pixel circuit, which indicates a timer-stop event.

The calculated analog-double-sampling-corrected pixel value is proportional to the time between the timer starts and the timer-end events.

FIG. 9 is a flowchart 900 that schematically illustrates a low-power low-area D-CDS method for converting incident light to pixel value, in accordance with an embodiment that is disclosed herein. The flowchart is executed by a control circuit 540 (FIG. 5), controlling devices in pixel circuit 102 (FIG. 1) and readout circuit 506 (FIG. 5).

The flowchart starts at a Send Reset Voltage operation 902, wherein the control circuit applies a Select pulse; consequently, the pixel circuit applies a voltage on a column line that is input to a readout circuit. The voltage level equals the voltage on a floating diffusion, minus the gate-drain drop of a select transistor that couples the pixel circuit to the column line.

At a subsequent Close Feedback Loop operation 904, the Control Circuit turns on a switch, to create a negative feedback loop, including a PMOS transistor that is connected as a diode. The loop settles the gate voltage of the PMOS transistor to a level in which the current is equal to a preset Ibias. This voltage is stored on a capacitor, at a node Vmem.

Next, at an Open-Loop operation 906, the control circuit opens the loop and then, at a Couple Sampling Step operation 908, the control circuit applies, through a capacitor, a current step to Vmem, causing to PMOS transistor to disconnect; the Ibias current will now flow through a parallel NMOS transistor.

Now, at a Linear Discharge operation 910, the control circuit controls a switch to linearly discharge Vmem, and indicates a Treset discharge time, from the start of the discharge until the current through the PMOS transistor equals the bias current (and, hence, no current flow through the parallel NMOS transistor).

Now, at a Send Pixel Voltage operation 912, the control circuit activates the Transfer and the Select controls, causing a full charge transfer from the photodetector to the floating diffusion and applying a corresponding voltage on the column line. The voltage level equals the voltage on the floating diffusion, minus the gate-drain drop of the select transistor.

Lastly, at a Restart Linear Discharge operation 914, the control circuit restarts the linear discharge in the readout circuit and indicates a Tpix discharge time until the current through the PMOS transistor equals the bias current.

The calculated digital-double-sampling-corrected pixel value is proportional to the difference Tpix-Treset.

The configurations of A-CDS imaging circuit 100 and D-CDS imaging circuit 500, including the corresponding waveforms 200 and 600 (and including the corresponding flowcharts 800, 900), are example configurations that are cited for the sake of conceptual clarity. Other configurations may be used in alternative embodiments.

For example, in embodiments, the readout circuit may also be used in a digital (uncorrelated) double sampling mode (requiring a larger value of Cstep). In another embodiment, readout circuit 106 and/or readout circuit 506 may be adapted for use with any other pixels that have a source follower output, including 3T pixels, global shutter (5T, 6T pixels), pixels with shared output transistors, pixels with dual conversion gain and pixels with lateral overflow integration capacitors (LOFIC) capacitors. In yet another embodiment the readout circuit can be implemented in a complementary fashion (changing between NMOS and PMOS devices), to fit pixels implemented in technologies using n-type substrate and PMOS devices.

Although the embodiments described herein mainly address current mode readout circuits of imaging devices, the techniques described herein can also be used in other applications, including suitable applications that can benefit from a low power/low area ADC.

FIG. 10 is a diagram 1000 that schematically illustrates various types of systems that may include any of the circuits, devices, or system discussed above, in accordance with embodiments that are described herein. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions, for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 10100 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1110.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

FIG. 11 is a block diagram illustrating an example non-transitory computer-readable storage medium that stores circuit design information, according to some embodiments that are described herein. In the illustrated embodiment semiconductor system fabrication 1120 is configured to process the design information 1115 stored on non-transitory computer-readable medium 1110 and fabricate integrated circuit 1130 based on the design information 1115.

Non-transitory computer-readable storage medium 1110, may include any of various appropriate types of memory devices or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system 1120. In some embodiments, design information 1115 may also include one or more cell libraries which specify the synthesis, layout, or both of integrated circuit 1130. In some embodiments, the design information is specified in whole or in part in the form of a netlist that specifies cell library elements and their connectivity. Design information 1115, taken alone, may or may not include sufficient information for fabrication of a corresponding integrated circuit. For example, design information 1115 may specify the circuit elements to be fabricated but not their physical layout. In this case, design information 1115 may need to be combined with layout information to actually fabricate the specified circuitry.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown in FIGS. 1 through 11. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . W, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An imaging device, comprising:
   a pixel-circuit comprising a photodetector, the pixel-circuit configured to (i) transfer a reset charge of the photodetector to a storage node upon being reset, (ii) generate a reset output voltage according to the reset charge, (iii) accumulate electrical charge in the photodetector in response to incident light, (iv) transfer the accumulated electrical charge to the storage node, and (v) generate a pixel output voltage according to the accumulated charge stored in the storage node; and
   a readout circuit, configured to:
      during a setup phase, charge a capacitor according to the reset output voltage; and
      during a measure phase, discharge the capacitor, and measure a discharge time until the charge on the capacitor is according to the pixel output voltage.

2. The imaging device according to claim 1, wherein the readout circuit is further configured, during the setup phase, to set the charge on the capacitor according to the reset output voltage and according to a preset bias current, and, during the measure phase, to measure the discharge time until the charge on the capacitor is according to the pixel output voltage and to the preset bias current.

3. The imaging device according to claim 1, wherein the readout circuit comprises:
   a first Metal-Oxide Semiconductor (MOS) transistor that is configured to, during the setup phase, to form a closed loop that sets the charge on the capacitor according to the reset output voltage and according to a preset bias current; and
   a second MOS transistor that is configured to conduct, during the measure phase, a difference between the preset bias current and the current through the first MOS device.

4. The imaging device according to claim 1, wherein the readout circuit comprises a noise reduction circuit that is switched during the setup phase and is configured to reduce a switching noise that affects a voltage on the capacitor.

5. An imaging device, comprising:
   a pixel-circuit comprising a photodetector, the pixel-circuit configured to (i) transfer a reset charge of the photodetector to a storage node upon being reset, (ii) generate a reset output voltage according to the reset charge, (iii) accumulate electrical charge in the photodetector in response to incident light, (iv) transfer the accumulated electrical charge to the storage node, and (v) generate a pixel output voltage according to the accumulated charge stored in the storage node; and
   a readout circuit, configured to:
      store a first charge on a capacitor, according to the reset output voltage;
      apply an additional voltage step to the capacitor, so as to reach a second charge;
      discharge the capacitor from the second charge, and measure a reset discharge time;
      re-charge the capacitor to the second charge;
      discharge the capacitor from the second charge until reaching a threshold that depends on the pixel output voltage, and measure a pixel discharge time; and
      calculate a digital corrected pixel value responsively to a difference between the pixel discharge time and the reset discharge time.

6. The imaging device according to claim 5, wherein the readout circuit is further configured to store the first charge on the capacitor according to the reset output voltage and according to a preset bias current.

7. The imaging device according to claim 5, wherein the readout circuit comprises:
   a first Metal-Oxide Semiconductor (MOS) transistor that is configured to form a closed loop that sets the first and second charges according to the reset output voltage and according to a preset bias current; and a second MOS transistor that is configured to conduct a difference between the preset bias current and the current through the first MOS device.

8. The imaging device according to claim 7, wherein the readout circuit further comprises a cascade-connected N-channel MOS (NMOS) transistor that increases a negative gain of the closed loop.

9. An imaging method, comprising:

using a pixel-circuit, (i) transferring a reset charge of a photodetector to a storage node upon being reset, (ii) generating a reset output voltage according to the reset charge, (iii) accumulating electrical charge in the photodetector in response to incident light, (iv) transferring the accumulated electrical charge to the storage node, and (v) generating a pixel output voltage according to the accumulated charge stored in the storage node; and using a readout circuit:

during a setup phase, charging a capacitor according to the reset output voltage; and during a measure the phase, discharging capacitor, and measuring a discharge time until the charge on the capacitor is according to the pixel output voltage.

10. An imaging method, comprising:

using a pixel-circuit, (i) transferring a reset charge of a photodetector to a storage node upon being reset, (ii) generating a reset output voltage according to the reset charge, (iii) accumulating electrical charge in the photodetector in response to incident light, (iv) transferring the accumulated electrical charge to the storage node, and (v) generating a pixel output voltage according to the accumulated charge stored in the storage node; and using a readout circuit:

storing a first charge on a capacitor, according to the reset output voltage;

applying an additional voltage step to the capacitor, so as to reach a second charge;

discharging the capacitor from the second charge, and measuring a reset discharge time;

re-charging the capacitor to the second charge;

discharging the capacitor from the second charge until reaching a threshold that depends on the pixel output voltage, and measuring a pixel discharge time; and calculating a digital corrected pixel value responsively to a difference between the pixel discharge time and the reset discharge time.

* * * * *